United States Patent
Kobori et al.

(10) Patent No.: US 9,424,230 B2
(45) Date of Patent: Aug. 23, 2016

(54) CONVERTING A DATA PLACEMENT BETWEEN MEMORY BANKS AND AN ARRAY PROCESSING SECTION

(75) Inventors: Tomoyoshi Kobori, Tokyo (JP); Katsutoshi Seki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 1196 days.

(21) Appl. No.: 12/594,757

(22) PCT Filed: Feb. 22, 2008

(86) PCT No.: PCT/JP2008/053043
§ 371 (c)(1),
(2), (4) Date: Oct. 5, 2009

(87) PCT Pub. No.: WO2008/129900
PCT Pub. Date: Oct. 30, 2008

(65) Prior Publication Data
US 2010/0131738 A1  May 27, 2010

(30) Foreign Application Priority Data

Apr. 12, 2007 (JP) ................................. 2007-104892

(51) Int. Cl.
G06F 15/173 (2006.01)
G06F 15/80 (2006.01)
G06T 1/20 (2006.01)

(52) U.S. Cl.
CPC ...... *G06F 15/8046* (2013.01); *G06F 15/17381* (2013.01); *G06T 1/20* (2013.01)

(58) Field of Classification Search
CPC .................................................. G06F 15/8046
See application file for complete search history.

(56) References Cited

U.S. PATENT DOCUMENTS

| 4,852,065 A | * | 7/1989 | Baddiley ........................ 365/221 |
| 5,148,547 A | * | 9/1992 | Kahle et al. ..................... 712/22 |
| 5,214,713 A | * | 5/1993 | Juvinall ........................ 382/142 |
| 5,557,734 A | * | 9/1996 | Wilson .......................... 345/505 |
| 5,581,773 A | * | 12/1996 | Glover ........................... 712/14 |
| 6,085,304 A | * | 7/2000 | Morris et al. ................... 712/22 |

(Continued)

FOREIGN PATENT DOCUMENTS

| JP | 62-267168 A | 11/1987 |
| JP | 6-266860 A | 9/1994 |

(Continued)

OTHER PUBLICATIONS

International Search Report for PCT/JP2008/053043 mailed May 13, 2008.
V. Strumpen et al., "Stream Algorithms and Architecture", Journal of Instruction-Level Parallelism Sep. 6, 2004, pp. 1-31.

*Primary Examiner* — Keith Vicary

(57) ABSTRACT

In an array processing section, using data strings entered from input ports, a plurality of data processor elements execute predetermined operations while transferring data to each other, and output data strings of results of the operations from a plurality of output ports. A first data string converter converts data strings stored in a plurality of data storages of a data storage group into a placement suitable for the operations in the array processing section, and enters the converted data strings into the input ports of the array processing section. A second data string converter converts the data strings output from output ports of the array processing section into a placement to be stored in the plurality of data storages of the data storage group.

14 Claims, 10 Drawing Sheets

(56) References Cited

U.S. PATENT DOCUMENTS

| | | | |
|---|---|---|---|
| 6,173,388 B1* | 1/2001 | Abercrombie et al. | 712/22 |
| 2006/0093044 A1 | 5/2006 | Grantham et al. | |
| 2006/0179156 A1 | 8/2006 | Eatherton et al. | |
| 2006/0218375 A1* | 9/2006 | Swarztrauber | 712/10 |
| 2008/0162824 A1* | 7/2008 | Jalowiecki et al. | 711/149 |
| 2010/0241824 A1* | 9/2010 | Carlson et al. | 712/22 |
| 2011/0107060 A1* | 5/2011 | McAllister et al. | 712/22 |

FOREIGN PATENT DOCUMENTS

| | | |
|---|---|---|
| JP | 8-221319 A | 8/1996 |
| JP | 11-345220 A | 12/1999 |
| JP | 2001092791 A | 4/2001 |
| JP | 2002175283 A | 6/2002 |
| JP | 2003067361 A | 3/2003 |
| JP | 2003263331 A | 9/2003 |

\* cited by examiner

CONVERTING A DATA PLACEMENT BETWEEN MEMORY BANKS AND AN ARRAY PROCESSING SECTION

TECHNICAL FIELD

The present invention relates to an array processor and more particularly to a systolic array.

BACKGROUND ART

One of the processor architectures which are designed to seek high operation capabilities is an array processor. The array processor comprises an array of processor elements (PEs) and a plurality of memory banks disposed in a peripheral region around the array of PEs. The PEs that are arranged in the array execute operations in parallel while at the same time receiving data from the peripheral memory banks, thereby achieving high operation capabilities as a whole. One example of the array processor is referred to as DSA (Decoupled Systolic Architecture) proposed by Volker Strumpen, et al. (see Volker Strumpen and two others "Stream Algorithms and Architecture", Journal of Instruction-Level Parallelism 6, Sep. 4, 2004. pp. 1-31 (hereinafter referred to as Document 1).

Document 1 discloses an array processor wherein PEs are arranged in an array of R×R (R refers to a natural number) and memory banks are disposed in a peripheral region around the array of PEs. FIG. 1 is a block diagram showing a configurational example of a general array processor. As shown in FIG. 1, the array processor has memory banks $20a, \ldots, 20d$, $21a, \ldots, 21d$ and array processing section 22.

For the sake of brevity, four memory banks are disposed each above and below array processing section 22 by way of example. Memory banks $20a, \ldots, 20d$ are disposed above array processing section 22, and memory banks $21a, \ldots, 21d$ are disposed below array processing section 22.

For the sake of convenience, memory banks $20a, \ldots, 20d$, $21a, \ldots, 21d$ are also assigned respective memory bank numbers. The memory bank numbers of eight memory banks $20a, \ldots, 20d, 21a, \ldots, 21d$ are #0, #7, respectively.

Array processing section 22 comprises a plurality of PEs $23a, \ldots, 23p$. Array processing section 22 is illustrated as comprising PEs that are arranged in an array of 4×4, for example.

The array processor operates to process data as follows: First, four memory banks $20a, \ldots, 20d$ which store data to be processed enter necessary data simultaneously into ports of array processing section 22. The entered data are transferred to the PEs that are connected to the ports.

The PEs execute predetermined operations on the received data, and transfer the results of the operations to other PEs. For example, the PEs transfer the results of the operations to PEs that are positioned below those PEs.

The array processor repeats the above process and transmits the data between the PEs for thereby carrying out desired operations. The path along which the data are transmitted between the PEs differs depending on the operations to be carried out. The data of the final results of the operations are output from PEs $23m, \ldots, 23p$ in the final stage to memory banks $21a, \ldots, 21d$, which store the data.

If the data are to be used again in next operations, then the array processor shifts the data between the memory banks into a data placement suitable for the next operations, and thereafter enters the shifted data into array processing section 22.

The array processor of the type described has higher processing parallelism because the plural PEs execute simultaneous operations, and exhibit higher operation capabilities than the von Neumann architecture which operates at the same frequency. Further-more, since the array processor enters data from the plural memory banks simultaneously in-to array processing section 22, it eliminates the bottleneck which the von Neumann architecture has had about memory access. In addition, the array processor is suitable for operations for stream data as it is capable of continuously processing data.

DISCLOSURE OF THE INVENTION

As described above, when the array processor executes operations using again the data that are output from array processing section 22 to memory banks $21a, \ldots, 21d$, the array processor needs to shift the data between the memory banks into a data placement suitable for the next operations. Consequently, when the array processor continuously executes a plurality of operations confined within itself, using again the data output to memory banks $21a, \ldots, 21d$, data are frequently transferred between the memory banks, resulting in a reduction in the processing efficiency.

For example, an instance wherein a 16-point FFT (Fast Fourier Transform) operation is divided into two stages, and each stage is processed using the array processor shown in FIG. 1 twice will be described below. FIG. 2 is a diagram showing flows of data at the time the 16-point FFT operation is carried out by the array processor. The operation comprises stage 1 and stage 2.

In stage 1, four data are processed altogether. In stage 2, each of the data is processed individually. In stage 2, the data stored in the same memory bank are sorted into different memory banks.

Inasmuch as the memory banks store the data in different manners in stage 1 and stage 2, as described above, memory banks #4, . . . , #7 need to transfer the data to each other between stage 1 and stage 2.

It is an object of the present invention to provide an array processor having a better processing efficiency which is capable of continuously carrying out a plurality of operations without the need for transferring data between memory banks that serve as data storages.

To achieve the above object, an array processor type data processing apparatus according to an aspect of the present invention comprises:

a data storage group comprising a plurality of data storages that store data strings respectively therein;

an array processing section having a plurality of data processor elements arranged in an array, a plurality of input ports, and a plurality of output ports, wherein using the data strings entered from said input ports, said plurality of data processor elements execute predetermined operations while transferring data to each other, and output data strings of results of the operations from said plurality of output ports;

a first data string converter that converts data strings stored in said plurality of data storages of said data storage group into a placement suitable for the operations in said array processing section, and enters the converted data strings into said input ports of said array processing section; and a second data string converter that converts the data strings output from said output ports of said array processing section into a placement to be stored in said plurality of data storages of said data storage group.

BEST MODE FOR CARRYING OUT THE INVENTION

An exemplary embodiment of the present invention will be described in detail below with reference to the drawings.

An array processor according to the present exemplary embodiment includes data string converters between memory banks and an array processing section.

The array processing section has a plurality of processor elements (PEs) arranged in an array, and executes operations in the PEs while at the same time transferring data between the PEs, thereby achieving a desired operations as a whole. The array processing section is multithreaded. An independent unit of processing is defined as a thread, and a set of data required for one thread as a data sequence. The multithreaded array processing section is configured to enter a plurality of data sequences continuously and process a plurality of threads by time-division multiplexing.

The data string converters serve to convert a data placement between the memory banks and the array processing section. The data string converters include a first data string converter for handling data directed from the memory banks to the array processing section and a second data string converter for handling data directed from the array processing section to the memory banks. The first data string converter converts data required for operations by the array processing section into a placement suitable for operations in the array processing section, and enters the converted data into the array processing section. The second data string converter converts data of the results of the operations output from the array processing section into a pattern for being stored in the memory banks, and outputs the converted data to the memory banks.

With the above configuration, since the data string converters convert the placements of the data, the data which are entered into the array processing section have a placement suitable for operations by the array processing section and the data which are entered into the memory banks have a placement suitable for storage in the memory banks, even though the placements of the data are not converted by data transfer between the memory banks. As a consequence, as no data need to be transferred between the memory banks when a plurality of operations are continuously carried out using the results of the preceding operations for the next operations, the processing efficiency is increased.

Furthermore, inasmuch as the resources of the data string converters are shared by a plurality of threads because of the multithreaded array processing section, the resources of the data string converters can be used efficiently.

1st Example

Figure 3:
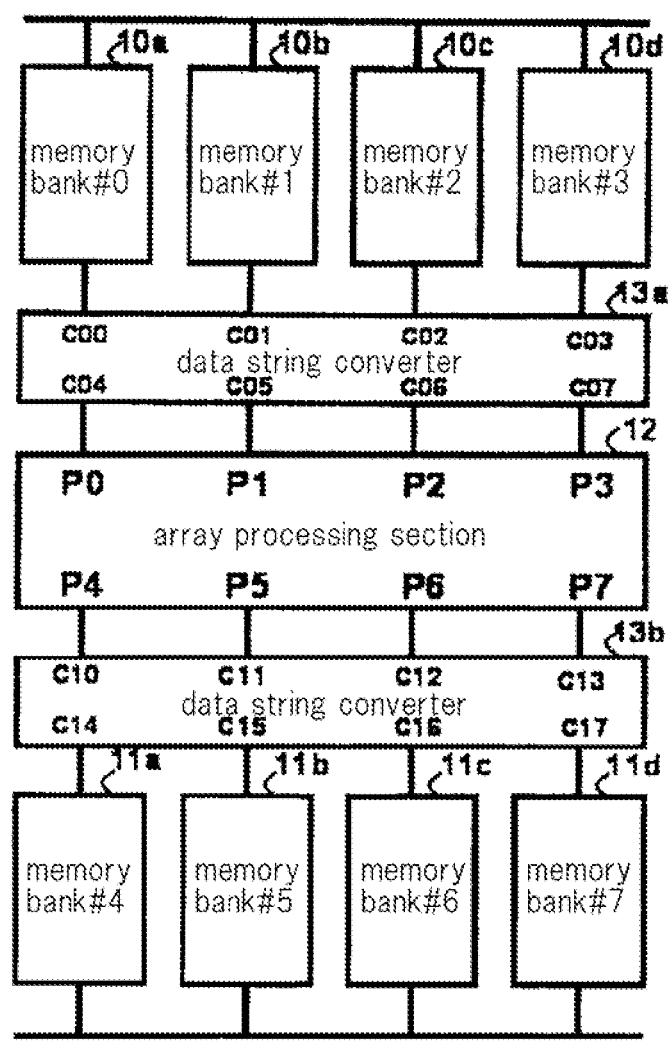
FIG. 3 is a block diagram showing a configuration of an array processor according to a first example.

FIG. 3 is a block diagram showing a configuration of an array processor according to a first example. As shown in FIG. 3, the array processor includes memory banks 10a, ..., 10d, 11a, ..., 11d, array processing section 12, and data string converters 13a, 13b. It is assumed that the number of memory banks which are disposed parallel to each other is 4, the number of input ports of array processing section 12 is 4, and the number of threads that can be handled by array processing section 12 is 4.

Memory banks 10a, ..., 10d are memory banks for storing data to be used in operations, and are disposed parallel to each other. Memory banks 10a, ..., 10d are connected to respective input ports C00, ..., C03 of data string converter 13a.

Data string converter 13a has input ports C00, ..., C03 connected respectively to memory banks 10a, ..., 10d and output ports C04, ..., C07 connected respectively to input ports P0, ..., P3 of array processing section 12. Data string converter 13a converts the placement of data that are entered from memory banks 10a, ..., 10d to input ports C00, ..., C03 thereof, and outputs the converted data from output ports C04, ..., C07 to array processing section 12.

Array processing section 12 has input ports P0, ..., P3 connected respectively to output ports C04, ..., C07 of data string converter 13a and output ports P4, ..., P7 connected respectively to input ports C10, ..., C13 of data string converter 13b. Array processing section 12 comprises a plurality of PEs (not shown) arranged in an array, executes operations in the PEs while at the same time transferring data between the PEs, and outputs the results of the operations from output ports P4, ..., P7 to data string converter 13b. Array processing section 12 is multithreaded, and is capable of processing a plurality of threads by time-division multiplexing, using data sequences that are entered continuously.

Data string converter 13b has input ports C10, ..., C13 connected respectively to output ports P4, ..., P7 of array processing section 12 and output ports C14, ..., C17 connected respectively to memory banks 11a, ..., 11d. Data string converter 13b converts the placement of data that are entered from array processing section 12 to input ports C10, ..., C13 thereof, and outputs the converted data from output ports C14, ..., C17 to memory banks 11a, ..., 11d.

Memory banks 11a, ..., 11d are memory banks for storing data of the results of operations, and are disposed parallel to each other. Memory banks 11a, ..., 11d are connected to respective output ports C14, ..., C17 of data string converter 13b. If the data stored in memory banks 11a, ..., 11d are to be used in next operations, then the data from memory banks 11a, ..., 11d can be entered into data string converter 13a without the need to be transferred to memory banks 10a, ..., 10d.

Operation of the array processor according to the first example will be described below.

A sequence of operation from reading data of four successive ports from memory banks 10a, ..., 10d, through executing operations on the data in array processing section 12, until writing data of the results of the operations into memory banks 11a, ..., 11d will be described below. It is assumed that data sequences required for the operations are stored respectively in memory banks 10a, ..., 10d in advance.

First, the array processor reads data of four ports altogether from memory banks 10a, ..., 10d. At this time, one word is read per cycle from memory banks 10a, ..., 10d, and hence data of four words are sequentially output in four cycles.

Data string converter 13a converts the placement of the data from memory banks 10a, ..., 10d, and outputs the converted data to array processing section 12.

Figure 4:
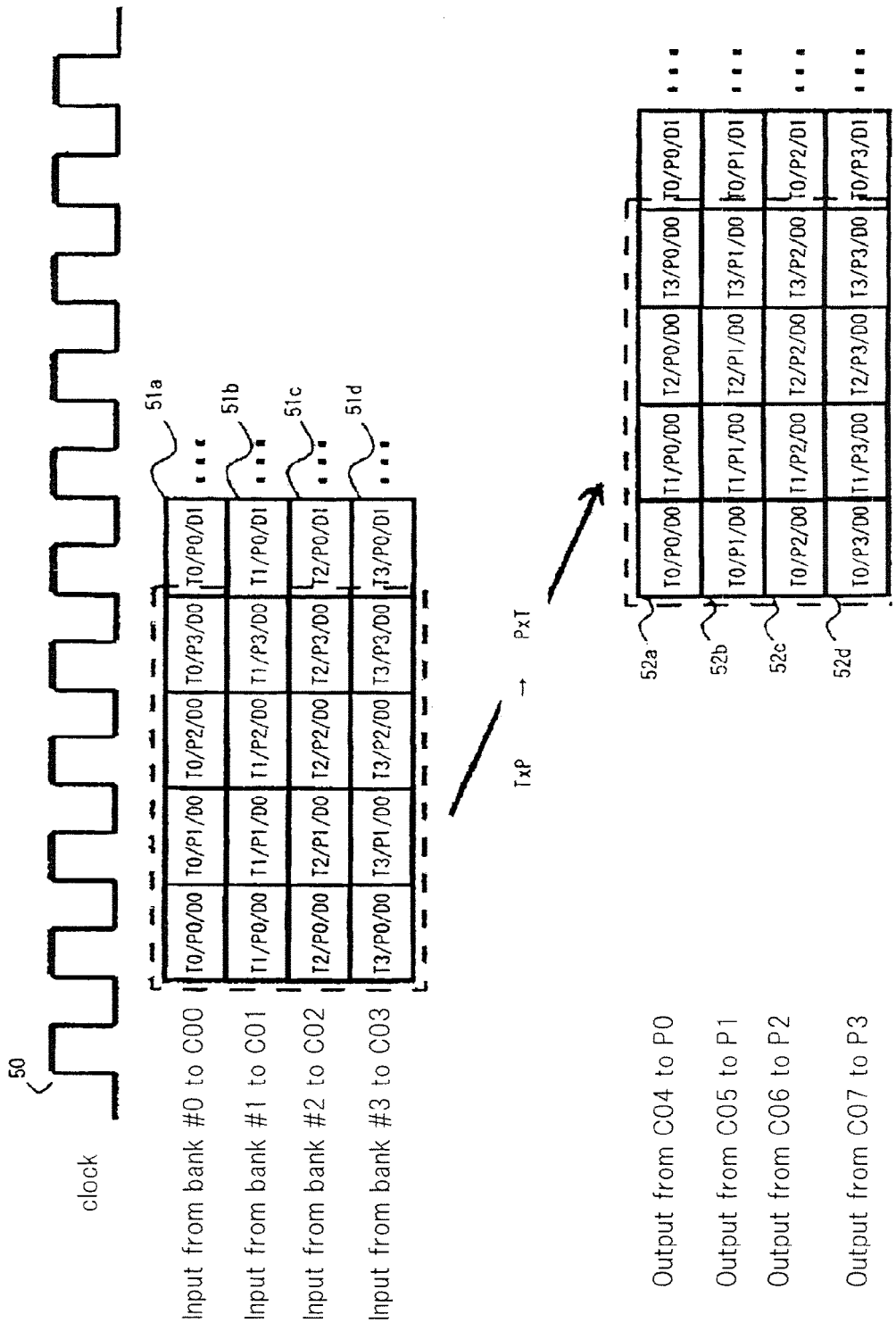
FIG. 4 is a timing chart showing input and output signals of data string converter 13a in the first example.

FIG. 4 is a timing chart showing input and output signals of data string converter 13a. FIG. 4 shows the manner in which the data to be transferred from memory banks 10a, ..., 10d to array processing section 12 are converted. Data processing section 12 operates in synchronism with input clock 50.

Input data 51a, ..., 51d are data that are entered into data string converter 13a. Suffixes a through d added to the reference numerals correspond respectively to input ports C00, ..., C03 of data string converter 13a. Output data 52a, ..., 52d are data that are output from data string converter 13a. Suffixes a through d added to the reference numerals correspond respectively to output ports C04, ..., C07 of data string converter 13a.

As shown in FIG. 4, data of a thread are sequentially entered into either one of the input ports. Data string converter 13a transposes the data such that the data entered into four input ports C00, ..., C03 thereof in one cycle of input clock 50 are sequentially output from one port. According to this transposition, the data sequence of a thread is converted from serial data into parallel data, and the data of one thread are output in one cycle. The data of a plurality of threads are sequentially output in time sequence.

When the data are entered from output ports C04, ..., C07 of data string converter 13a into respective input ports P0, ..., P3 of array processing section 12, the PEs of array processing section 12 execute operations on the data, and output the results of the operations from output ports P4, ..., P7.

Figure 5:
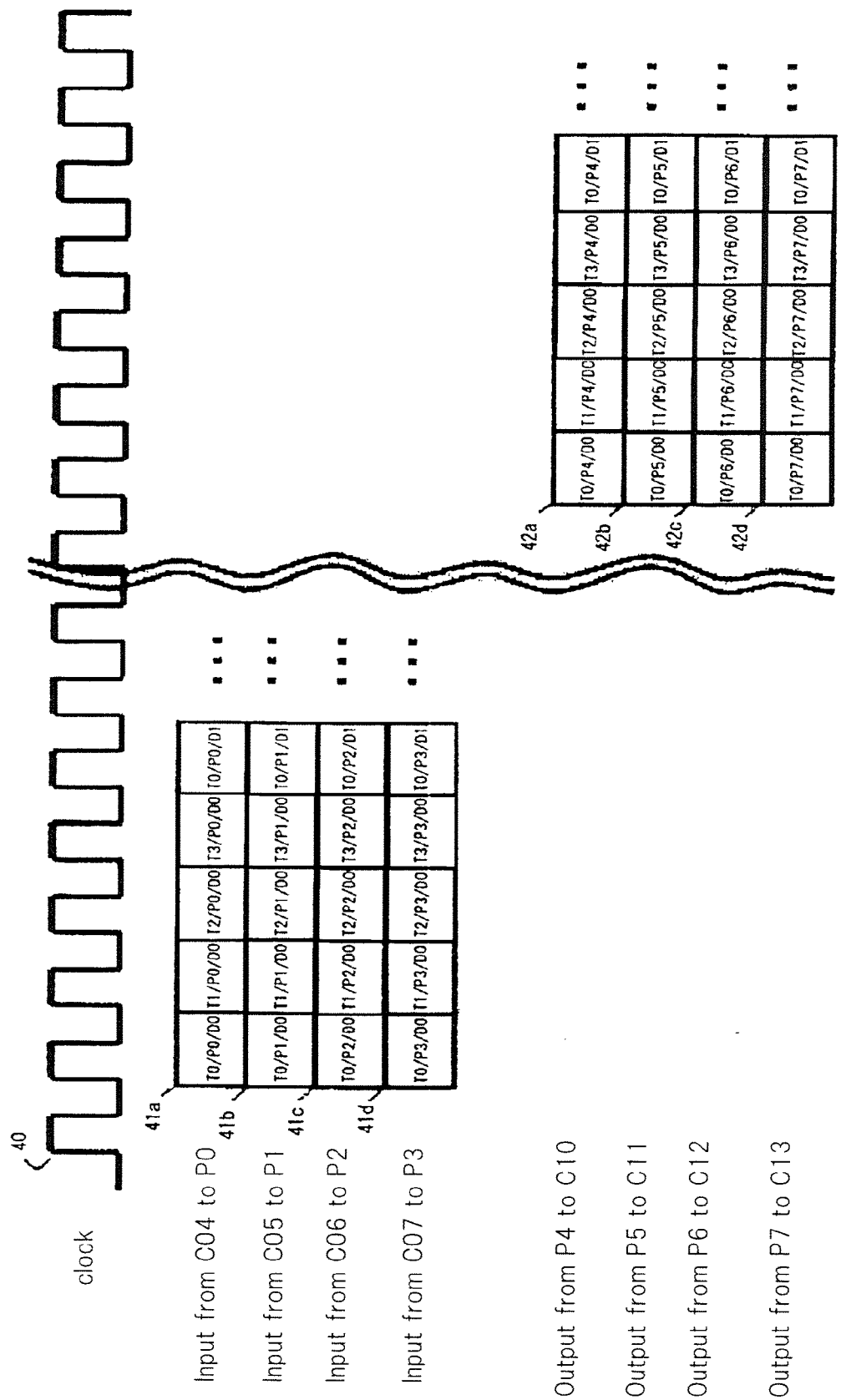
FIG. 5 is a timing chart showing input and output signals of array processing section 12 in the first example.

FIG. 5 is a timing chart showing input and output signals of array processing section 12. Array processing section 12 is supplied with input clock 40.

Input data 41a, ..., 41d are data that are entered into array processing section 12. Four data per clock pulse are simultaneously entered into array processing section 12. Suffixes a through d correspond respectively to input ports P0, ..., P3. Output data 42a, ... 42d are data that are output from array processing section 12. Four data per clock pulse are simultaneously output from array processing section 12. Suffixes a through d correspond respectively to output ports P4, ..., P7.

T0 through T3 included in the names of the data represent thread numbers 0 through 3. As shown in FIG. 5, the data that are entered in an ascending order of thread numbers from thread number 0 (T0) to thread number 3 (T3) are sequentially processed per thread. The threads are processed independently of each other and do not affect each other's operations. The results of the operations on one thread are simultaneously output from four output ports P4, ..., P7 in an ascending order of thread numbers. The results of the operations that are output from output ports P4, ..., P7 of array processing section 12 are converted again in placement by a transposition performed by data string converter 13b.

Figure 6:
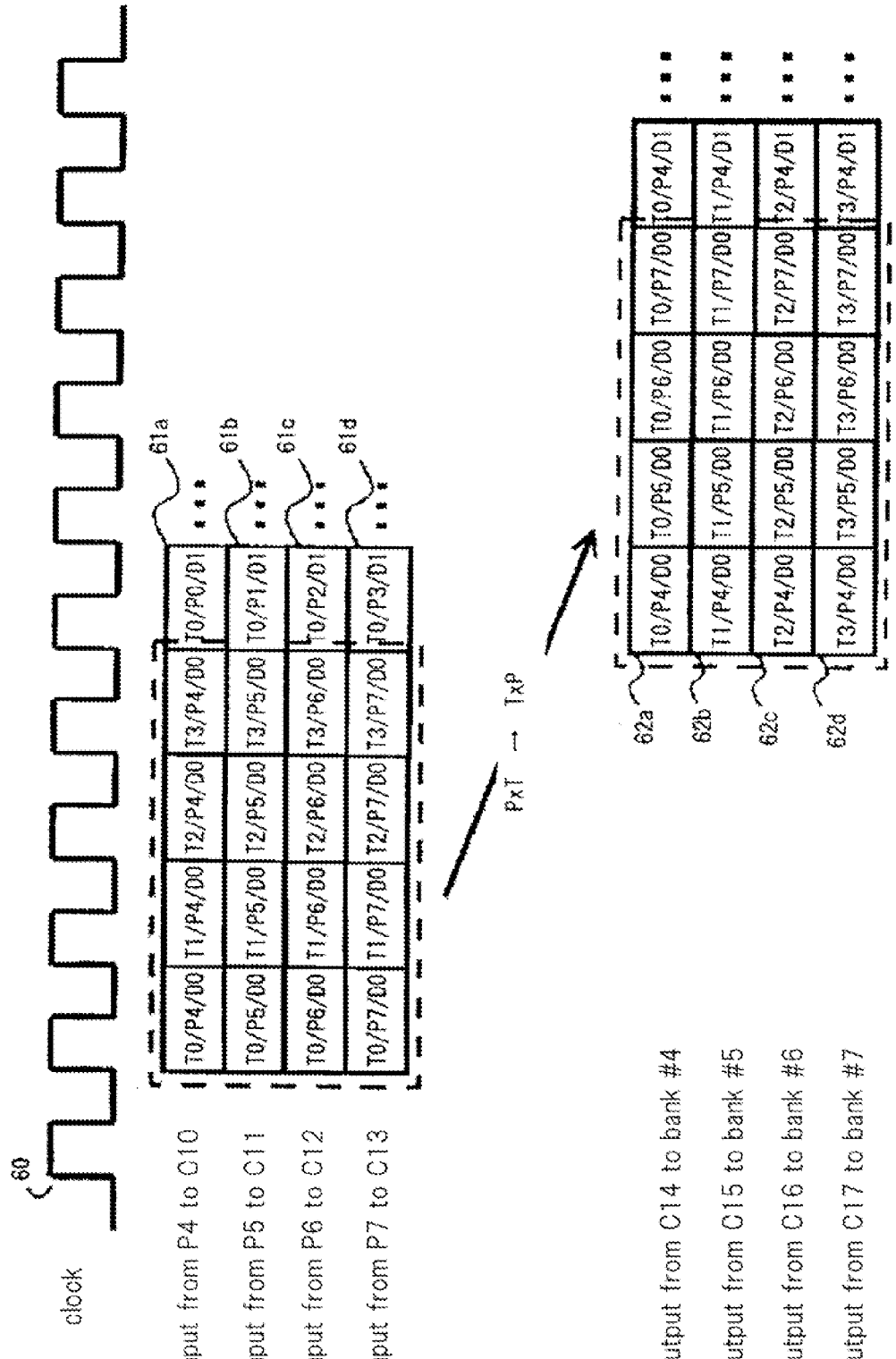
FIG. 6 is a timing chart showing input and output signals of data string converter 13b in the first example.

FIG. 6 is a timing chart showing input and output signals of data string converter 13b. Data string converter 13b is supplied with input clock 60. Input data 61a, ..., 61d are data that are entered into data string converter 13b. Suffixes a through d added to the reference numerals correspond respectively to input ports C10, ..., C13 of data string converter 13b. Output data 62a, ..., 62d are data that are output from data string converter 13b. Suffixes a through d added to the reference numerals correspond respectively to output ports C14, ..., C17 of data string converter 13b.

As shown in FIG. 6, data entered into data string converter 13b in one cycle are converted into data of one output port by a transposition performed by data string converter 13b. According to this transposition, the data of the results of the operations on a thread are converted from parallel data into serial data, and the data of one thread are sequentially output from one output port in time sequence. The data output from respective output ports C14, ..., C17 are stored in respective memory banks 11a, ..., 11d.

As a result, since the data of each thread are stored altogether in memory banks 11a, ..., 11d, if the data stored in memory banks 11a, ..., 11d are to be used in next operations, then the data from memory banks 11a, ..., 11d may be directly written into data string converter 13a without the need to be transferred between the memory banks.

According to the present example, as described above, since data string converters 13a, 13b convert the placements of data into placements appropriate for operations to match the ports of array processing section 12, the data do not need to be transferred between the memory banks when a plurality of operations are continuously carried out using the results of the preceding operations for the next operations, the processing efficiency is increased.

Furthermore, even though the data sequence of one thread is stored altogether in one memory bank, since data string converter 13a transposes the placement of the data to match the input ports of array processing section 12, array processing section 12 can process the data parallel to each other without the need for transferring the data between the memory banks.

Moreover, inasmuch as the resources of data string converters 13a, 13b are shared by a plurality of threads because of multithreaded array processing section 12, the resources of the data string converters can be used efficiently.

In the present example, the number of parallel memory banks, the number of input ports of array processing section 12, and the number of threads that can be handled by array processing section 12 are 4 each. However, the number 4 is given by way of example only, and the present invention should not be limited to the number 4. Insofar as the number of memory banks, the number of input ports of array processing section 12, and the number of threads that can be handled by array processing section 12 are all equal and N (natural number) each, then such a configuration can be considered in the same fashion as the present example.

In the present example, only input and output timings are limited by the multithreading of array processing section 12.

2nd Example

The second example is a modification of the first example. The second example is different from the first example in that array processing section 12 is capable of handling as many threads as N (N is an integer) times the number of parallel memory banks or the number of input ports. In the second example, the number of parallel memory banks and the number of input ports are 4 each, and the number of threads that can be handled by array processing section 12 is 8.

Memory banks 10a, ..., 10d store data sequences of threads having thread numbers T0, ..., T8. It is assumed that two threads are paired and stored in one memory bank. Specifically, memory bank 10a stores threads having thread numbers T0, T4, memory bank 10b stores threads having thread numbers T1, T5, memory bank 10c stores threads having thread numbers T2, T6, and memory bank 10d stores threads having thread numbers T3, T7.

Operation of the array processor will be described below.

A sequence of operation from reading data of four successive ports from memory banks 10a, ..., 10d, through executing operations on the data in array processing section 12, until writing data of the results of the operations into memory banks 11a, ..., 11d will be described below. It is assumed that data sequences required for the operations are stored respectively in memory banks 10a, ..., 10d in advance.

First, the array processor reads data of four words in four cycles, one word per cycle, sequentially from memory banks 10a, ..., 10d, and enters the data into data string converter 13a.

Figure 7:
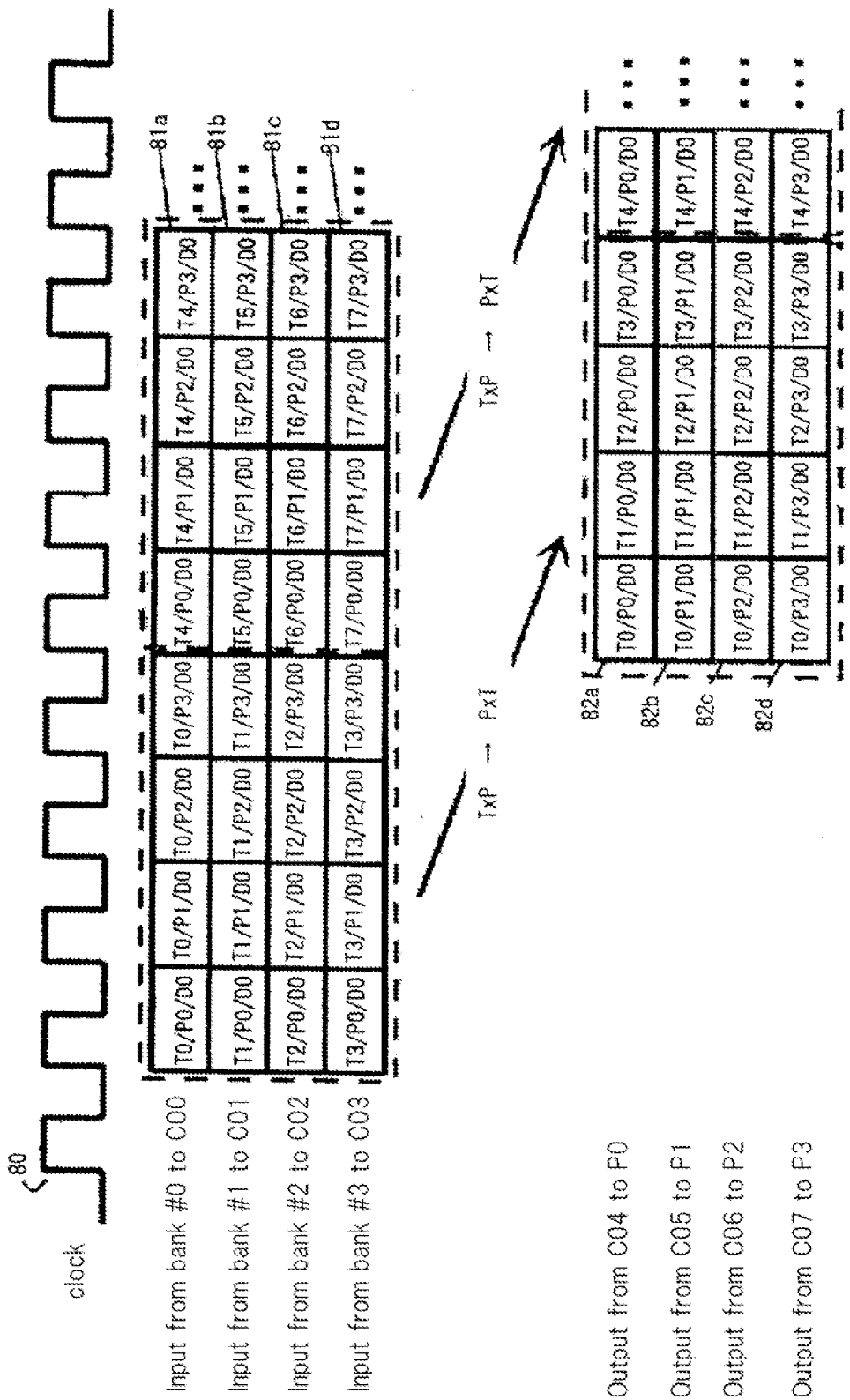
FIG. 7 is a timing chart showing input and output signals of data string converter 13a in a second example.

FIG. 7 is a timing chart showing input and output signals of data string converter 13a. FIG. 7 shows the manner in which the data to be transferred from memory banks 10a, ..., 10b to array processing section 12 are converted. Data string converter 13a is supplied with input clock 80.

Input data 81a, ..., 81d are data that are entered into data string converter 13a. Suffixes a through d added to the reference numerals correspond respectively to input ports C00, ..., C03 of the data string converter. Data in four cycles are read, one in one cycle, from memory banks 11a, ..., 11d, and entered into input ports C00, ..., C03 of data string converter 13a. Data for one thread are read, one word in one cycle, sequentially from one memory bank 11a. The data sequence of one thread comprises four words.

The data in four cycles that are read at this time comprise data sequences of former four threads (thread numbers T0 through T3) of the eight threads. Thereafter, data sequences of latter four threads (thread numbers T4 through T7) are read and entered into input ports C00, ..., C03 of data string converter 13a.

Output data 82a, ..., 82d are data that are output from data string converter 13a. Suffixes a through d added to the reference numerals correspond respectively to output ports C04, ..., C07 of data string converter 13a.

As shown in FIG. 7, the data entered into four input ports C00, ..., C03 in one cycle of input block 80 are converted into data to be output to one port by a transposition performed by data string converter 13a. Output ports C04, ..., C07 of data string converter 13a output data in the order of thread numbers T0 through T7, which are entered into input ports P0, ..., P3 of array processing unit 12.

When the data from output ports C04, ..., C07 of data string converter 13a are entered into respective input ports P0, ..., P3 of array processing unit 12, the PEs of array processing section 12 execute operations on the data, and output the results of the operations from output ports P4, ..., P7.

Figure 8:
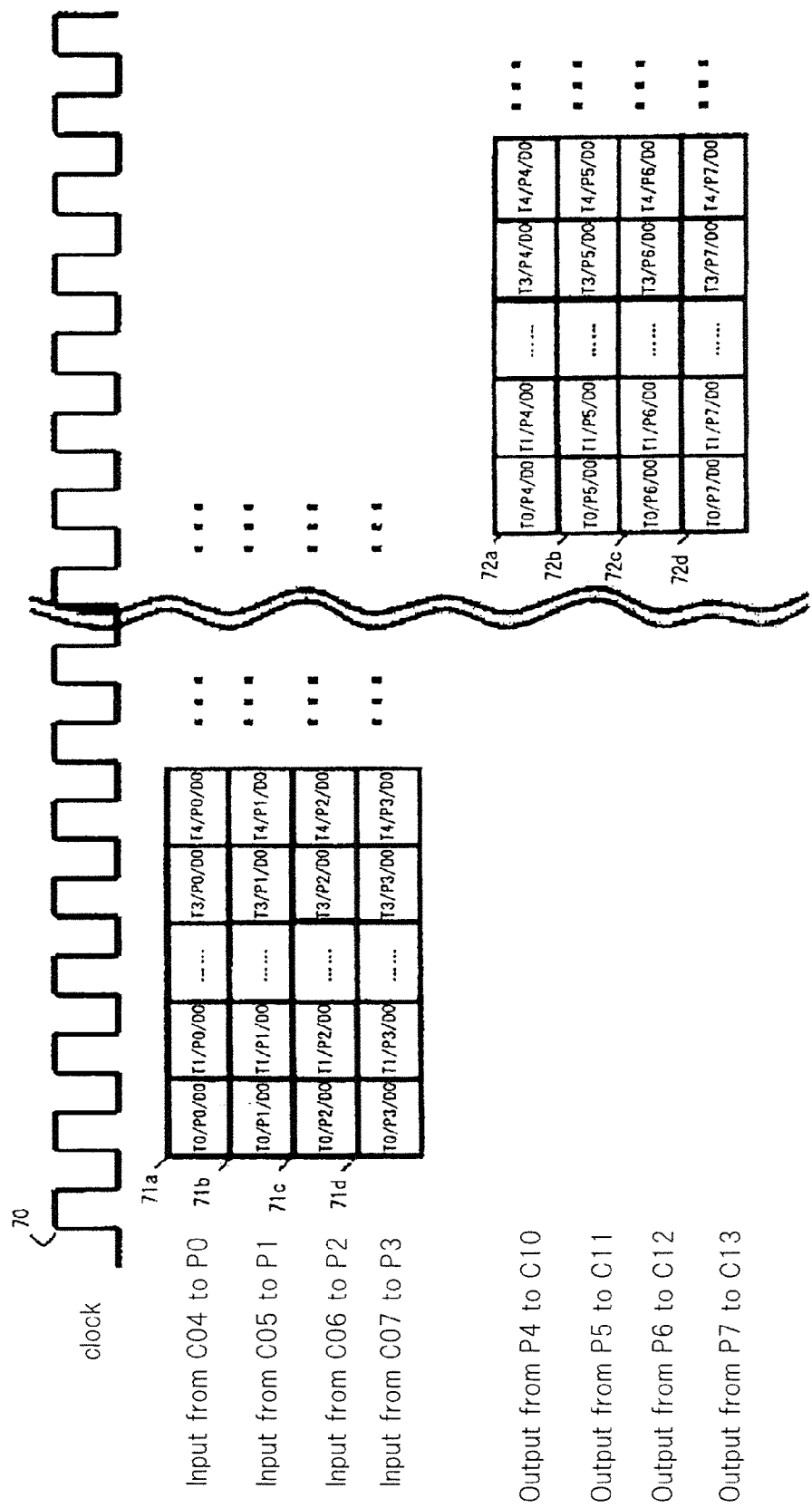
FIG. 8 is a timing chart showing input and output signals of array processing section 12 in the second example.

FIG. 8 is a timing chart showing input and output signals of array processing section 12. Array processing section 12 is supplied with input clock 70.

Input data 71a, ..., 71d are data that are entered into array processing section 12. Data of four words per cycle are simultaneously entered into array processing section 12 in synchronism with input clock 70. Suffixes a through d added to the reference numerals correspond respectively to inputs to input ports P0, ..., P3.

Output data 72a, ..., 72d are data that are output from array processing section 12. Four data per cycle are simultaneously output from array processing section 12. Suffixes a through d added to the reference numerals correspond respectively to output ports P4, ..., P7.

As shown in FIG. 8, the data that are entered in an ascending order of thread numbers from thread number 0 (T0) to thread number 3 (T3) are sequentially processed per thread. The threads are processed independently of each other and do not affect each other's operations. Four words of the results of the operations on one thread are simultaneously output from four output ports P4, ..., P7 in an ascending order of thread numbers. The results of the operations that are output from output ports P4, ..., P7 of array processing section 12 are converted again in placement by a transposition performed by data string converter 13b.

Figure 9:
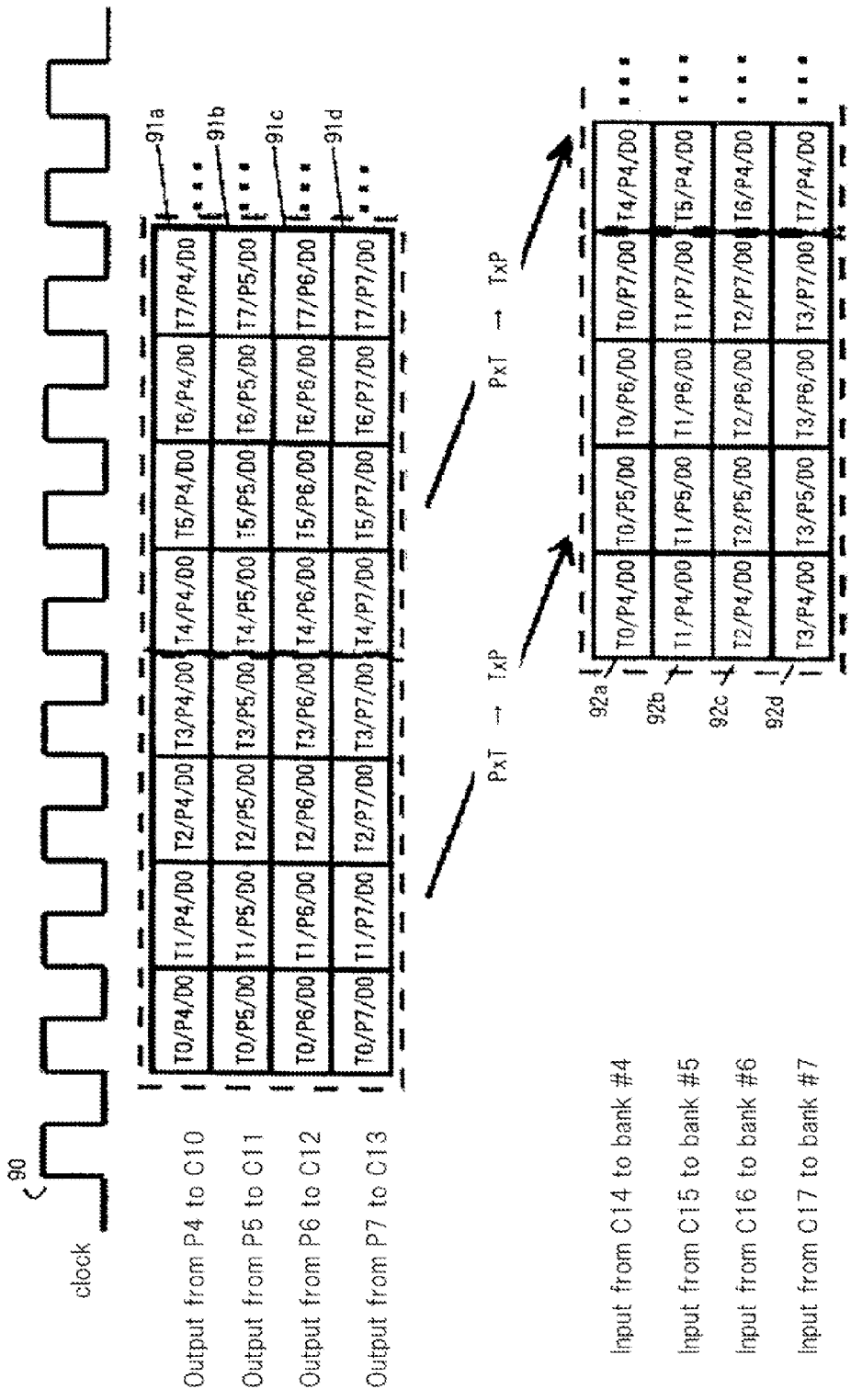
FIG. 9 is a timing chart showing input and output signals of data string converter 13b in the second example.

FIG. 9 is a timing chart showing input and output signals of data string converter 13b. Data string converter 13b is supplied with input clock 90. Input data 91a, ..., 91d are entered into data string converter 13b. Suffixes a through d added to the reference numerals correspond respectively to input ports C10, ..., C13 of data string converter 13b.

Output data 92a, ..., 92d are data that are output from data string converter 13b. Suffixes a through d added to the reference numerals correspond respectively to output ports C14, ..., C17 of data string converter 13b.

As shown in FIG. 9, data entered into data string converter 13b in one cycle are converted into data of one output port by a transposition performed by data string converter 13b. The data output from respective output ports C14, ..., C17 are stored in respective memory banks 11a, ..., 11d.

As a result, since the data of each thread are stored altogether in memory banks 11a, ..., 11d, if the data stored in memory banks 11a, ... 11d are to be used in next operations, then the data from memory banks 11a, ..., 11d may be directly written into data string converter 13a without the need to be transferred between the memory banks.

According to the present example, the data of two threads are stored in one memory bank. As data string converter 13a transposes the placement of the data to match the input ports of array processing section 12, array processing section 12 can process the data in parallel and by time-division multiplexing without the need for transferring the data between the memory banks.

In the present example, it has been specified for the sake of brevity that the number of parallel memory banks is 4, the number of input ports of array processing section 12 is 4, and the number of threads that can be handled by array processing section 12 are 8. However, the numbers are given by way of example only, and the present invention should not be limited to those numbers. Insofar as the number of memory banks and the number of input ports of array processing section 12 are equal to each other, and the number of threads that can be handled by array processing section 12 is N (natural number), then such a configuration can be considered in the same fashion as the present example.

In the present example, only input and output timings are limited by the multithreading of array processing section 12.

3rd Example

The third example is also a modification of the first example. The third example is different from the first example as to the placement of memory banks. The array processor according to the first example includes four memory banks 10a, ..., 10d disposed above array processing section 12, and four memory banks 11a, ..., 11d disposed below array processing section 12. The array processor according to the third example includes a single multiport memory bank instead of the two memory banks that are disposed above and below array processing section 12 according to the first example.

Figure 10:
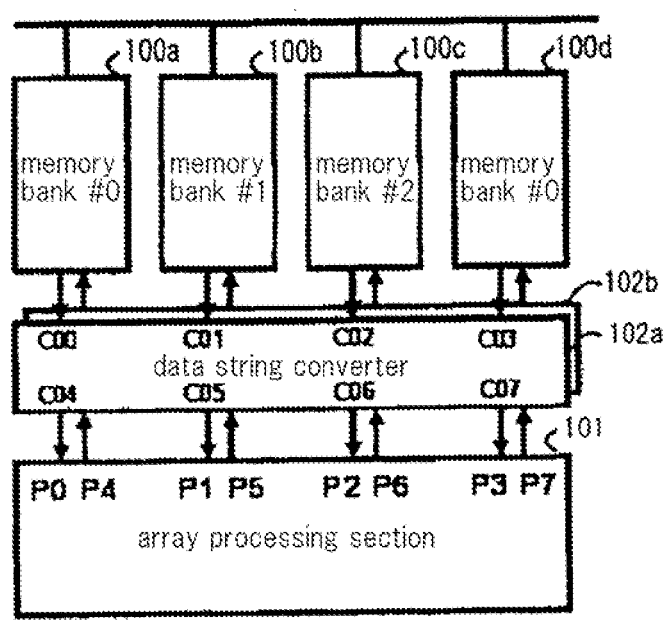
FIG. 10 is a block diagram showing a configuration of an array processor according to a third example.

FIG. 10 is a block diagram showing a configuration of the array processor according to the third example. As shown in FIG. 10, the array processor comprises memory banks 100a, ..., 100d, array processing section 101, and data string converters 102a, 102b. According to the present example, as with the first example, it is assumed that four memory banks are disposed parallel to each other, array processing section 12 has four input ports, and array processing section 12 can handle four threads.

Memory banks 100a, ..., 100d are memory banks for storing data to be used in operations, and are disposed parallel to each other. Memory banks 100a, ..., 100d are connected to respective input ports of data string converter 102a and respective output ports of data string converter 102b.

Array processing section 101 has input ports P0, ..., P3 connected respectively to output ports of data string converter 102a and output ports P4, ..., P7 connected respectively to input ports of data string converter 102b. Array processing section 101 comprises a plurality of PEs arranged in an array, executes operations in the PEs using data entered from input ports P0, ..., P3, and outputs the results of the operations from output ports P4, ..., P7. Array processing section 101 is multithreaded, and is capable of processing a plurality of threads by time-division multiplexing, using data sequences that are entered continuously.

Data string converter 102a has input ports C00, ..., C03 connected respectively to memory banks 100a, ..., 100d and output ports C04, ..., C07 connected respectively to input ports P0, ..., P3 of array processing section 12.

Data string converter 102b has input ports C00, ..., C03 connected respectively to output ports P4, ..., P7 of array processing section 12 and output ports C04, ..., C07 connected respectively to memory banks 100a, ..., 100d.

According to the present example, since multiport memory banks 100a, ..., 100d are used, both data string converters 102a, 102b are disposed between array processing section 101 and memory banks 100a, ..., 100d. Data string converters 102a, 102b transpose data that are sequentially entered from input ports C00, ..., C03 thereof and output the transposed data sequentially from output ports C04, ..., C07 thereof.

Operation of the array processor will be described below.

A sequence of operation from reading data of four ports continuously from memory banks 100a, ..., 100d, through executing operations on the data in array processing section 101, until writing data of the results of the operations into memory banks 100a, ..., 100d will be described below. It is assumed that data sequences required for the operations are stored respectively in memory banks 100a, ..., 100d in advance.

First, the array processor reads data of four ports altogether from memory banks 100a, ..., 100d. At this time, one word is read per cycle from memory banks 100a, ..., 100d, and hence data of four words are sequentially output in four cycles.

Data string converter 102a converts the placement of the data from memory banks 100a, ..., 100d, and outputs the converted data to array processing section 101.

The timings of the input and output signals of data string converter 102a are the same as those according to the first example shown in FIG. 4. As shown in FIG. 4, data of respective threads are entered into four input ports C00, ..., C03 in the order of port numbers. Data of respective ports are output from output ports C04, ..., C07 in the order of thread numbers by a transposition performed by data string converter 102a.

When the data from output ports C04, ..., C07 of data string converter 102a are entered respectively into ports P0, ... P3 of array processing section 101, the PEs of array processing section 12 execute operations on the data, and output the results of the operations from output ports P4, ..., P7.

The timings of the input and output signals of array processing section 101 are the same as those according to the first example shown in FIG. 5. As shown in FIG. 5, the data that are entered in an ascending order of thread numbers from thread number 0 (T0) to thread number 3 (T3) are sequentially processed per thread. The threads are processed independently of each other and do not affect each other's operations. The results of the operations on one thread are simultaneously output from four output ports P4, ..., P7 in an ascending order of thread numbers. The results of the operations that are output from output ports P4, ..., P7 of array processing section 101 are converted again in placement by a transposition performed by data string converter 102b.

Data string converter 102b converts the data according to the same process as with the first example shown in FIG. 6. Data string converter 102b transposes the data such that the data entered into four input ports C00, ..., C03 thereof in one cycle of input clock 50 are sequentially output from one output port. The data output from respective output ports C04, ..., C07 are stored in respective memory banks 100a, ..., 100d.

As a result, since the data of each thread are stored altogether in memory banks 100a, ..., 100d, if the data stored in memory banks 100a, ..., 100d are to be used in next operations, then the data from memory banks 100a, ..., 100d may be directly written into data string converter 102a without the need to be transferred between the memory banks.

According to the present example, the use of multiport memory banks makes it unnecessary to dispose memory banks 100a, ..., 100d physically on both sides (above and below as shown) of array processing section 101. This is effective to simplify the interconnections of input and output buses connected to external circuits.

In the present example, the number of parallel memory banks, the number of input ports of array processing section 101, and the number of threads that can be handled by array processing section 101 are also 4 each. However, the present invention should not be limited to the number 4. Insofar as the number of memory banks, the number of input ports of array processing section 12, and the number of threads that can be handled by array processing section 12 are N (natural number) each, then such a configuration can be considered in the same fashion as the present example.

In the present example, only input and output timings are limited by the multithreading of array processing section 12.

4th Example

The fourth example is a modification of the third example. As with the second example, the fourth example is different from the third example in that the array processing section is capable of handling as many threads as N (N is an integer) times the number of parallel memory banks or the number of input ports.

The array processor according to the present example includes an array processing section and data string converters which are identical to those of the second example. According to the present example, the array processor employs multiport memory banks, and both the data string converter on the input side of the array processing section and the data string converter on the output side of the array processing section are connected to the memory banks as with the third example.

According to the present example, the number of memory banks and the number of input ports of array processing section may be equal to each other, and the number of threads that can be handled by the array processing section may be N (natural number).

5th Example

Figure 1:
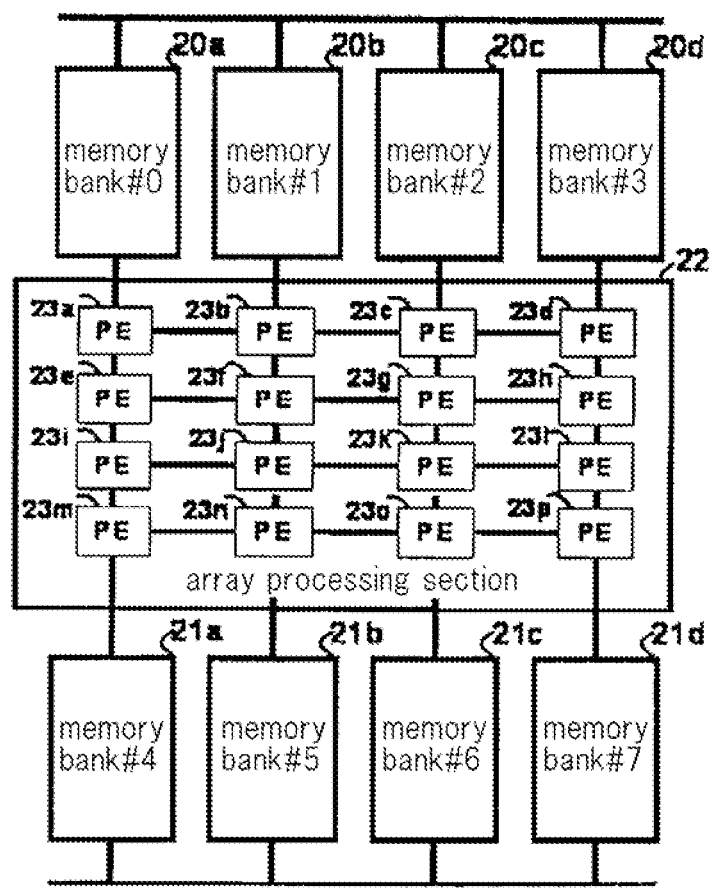
FIG. 1 is a block diagram showing a configurational example of a general array processor.
Figure 2:
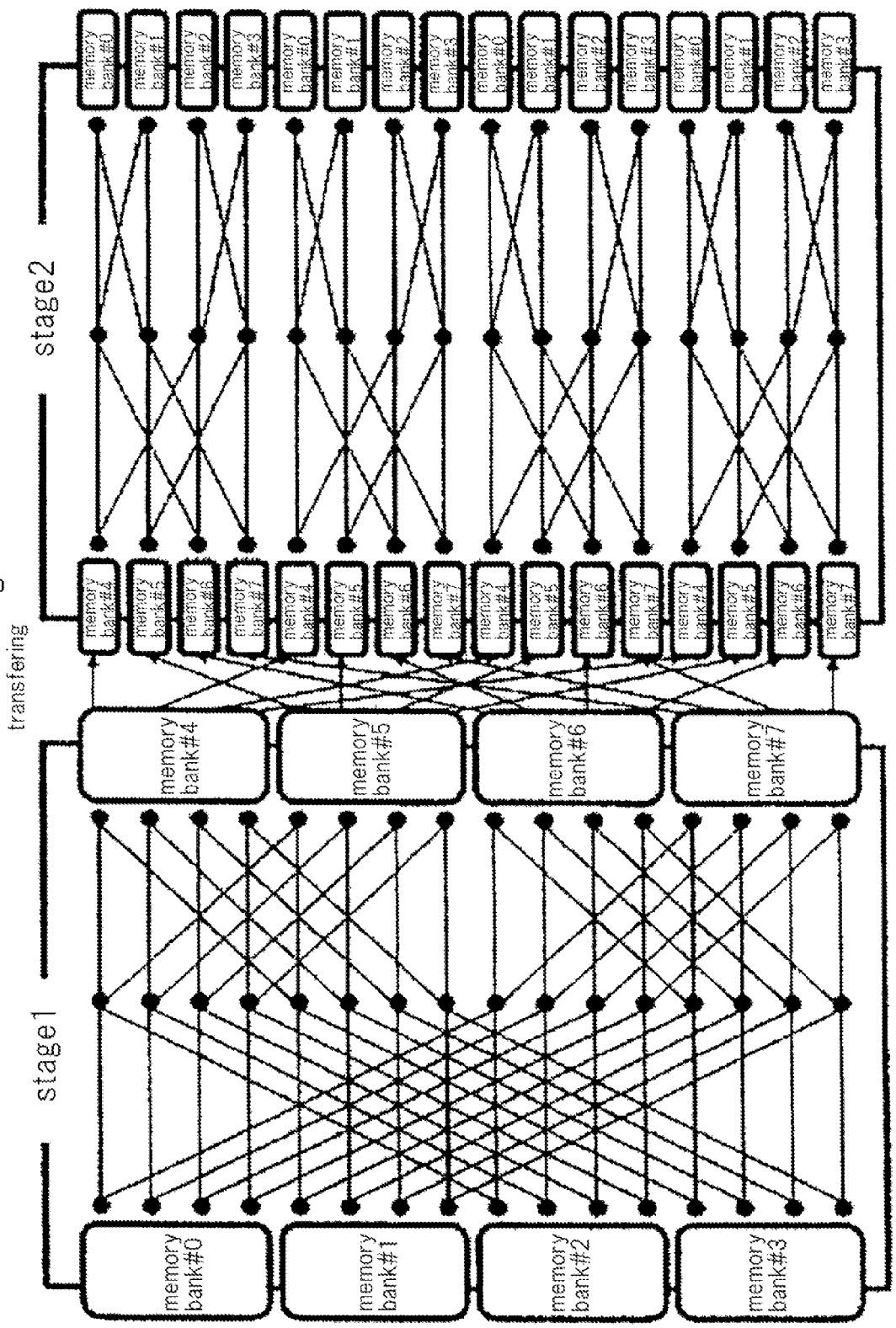
FIG. 2 is a is a diagram showing flows of data at the time a 16-point FFT operation is carried out by an array processor.

According to the fifth example, it is possible to specify a conversion method by which a data string converter converts a data string, from outside of the data string converter. An array processor according to the present example may be of a configuration which is the same as that of the first example shown in FIG. 1 or a configuration which is the same as that of the third example shown in FIG. 10. In any case, according to the present example, the data string converter converts data that are sequentially entered into input ports thereof according to the conversion method which is specified from outside, and outputs the converted data from output ports thereof.

According to the present example, since it is possible to specify how to convert the data between the memory banks and the array processing section with the data string converter, the degree of freedom of operations that can continuously be performed by the array processing section without the need for transferring data between the memory banks is increased.

According to the present example, furthermore, the data string converter may be operated in the same manner as the data string converters according to the first through fourth examples.

According to the present example, moreover, even if many memory banks are employed and large-scale operations are executed by repetitively using the array processing section, no data need to be transferred between the memory banks when the conversion method is specified for the data string converter in order to bring data entered into the input ports of the array processing section into a placement suitable for desired operations.

The present invention has been described above in reference to the exemplary embodiment (and the examples) thereof. However, the present invention is not limited to the exemplary embodiment (and the examples). Various changes that can be understood by those skilled in the art can be made in the configurations and details of the present invention as defined by the claims within the scope of the present invention.

The present application is the National Phase of PCT/JP2008/053043, filed Feb. 22, 2008, which claims the benefits of priority based on Japanese patent application No. 2007-104892 filed on Apr. 12, 2007, and incorporates herein the disclosure thereof in its entirety by reference.

The invention claimed is:

1. An array processor type data processing apparatus comprising:
   a data storage group comprising a plurality of data storages that store data strings respectively therein;
   an array processing section having a plurality of data processor elements arranged in an array of P×T, P and T being natural numbers equal to or larger than two, a plurality of input ports whose number is P, and a plurality of output ports whose number is P, wherein using data strings, whose number is T, entered from each of said plurality of input ports, said plurality of data processor elements execute predetermined operations while transferring data to each other, and output data strings of results of the operations from said plurality of output ports;
   a first data string converter that converts data strings stored in said plurality of data storages of said data storage group into a P×T placement suitable for the operations in said array processing section, and enters the converted data strings into said plurality of input ports of said array processing section; and
   a second data string converter that converts the data strings output from said plurality of output ports of said array processing section into a T×P placement to be stored in said plurality of data storages of said data storage group;
   wherein said array processing section is multithreaded so as to process a plurality of threads, each serving as an independent processing unit continuously by time-division multiplexing, and outputs results of operations on the threads which have been processed by time-division multiplexing in an order in which the threads are processed;
   said data storage group stores data sequences, which are data strings for the threads, as units of said threads altogether in said data storages, respectively;
   said first data string converter and said second data string converter have resources to convert the placement of the data strings, shared by the threads;
   said first data string converter converts the placement of data such that data entered in a plurality of cycles into one input port of the first data string converter are output in one cycle from a plurality of output ports of the first data string converter, and data entered in one cycle into a plurality of input ports of the first data string converter are output in a plurality of cycles from one output port of the first data string converter, thereby converting the placement of the data strings stored in the plurality of data storages of said data storage group into the P×T placement suitable for the operations in said array processing section; and
   said second data string converter converts the placement of data such that data entered in one cycle into a plurality of input ports of the second data string converter are output in a plurality of cycles from one output port of the second data string converter, and data entered in a plurality of cycles into one input port of the second data string converter are output in one cycle from a plurality of output ports of the second data string converter, thereby converting the placement of the data strings output from said plurality of output ports of said array processing section into the T×P placement to be stored in said plurality of data storages,
   wherein T is a number of said plurality of threads, and P is equal to T,
   wherein the P×T placement is a P×T array, the T×P placement is a T×P array,
   wherein in each of a plurality of P clock cycles, a successive column of the T×P array is input to said first data string converter,
   wherein in each of a plurality of T clock cycles beginning immediately after the plurality of P clock cycles, a successive row of the T×P array is output by said first data string converter as a corresponding successive column of the P×T array.

2. The array processor type data processing apparatus according to claim 1, wherein
   said first data string converter converts the data strings for the threads stored in said data storages of said data storage group from serial data into parallel data, and arranges the converted data strings as units of said threads in time sequence, thereby converting the placement of the data strings stored in the plurality of data storages of said data storage group into the placement suitable for the operations in said array processing section; and
   said second data string converter converts data strings of results of operations on the threads which have been output from said array processing section from parallel data into serial data, and arranges the converted data strings as units of said threads in parallel, thereby converting the placement of the data strings output from said output ports of said array processing section into the placement to be stored in said plurality of data storages.

3. The array processor type data processing apparatus according to claim 1, wherein the number of data strings which can be processed by said array processing section in time-division multiplexing is equal to a number of output ports of said first data string converter or a number of input ports of said second data string converter.

4. The array processor type data processing apparatus according to claim 1, wherein the number of data strings which can be processed by said array processing section in time-division multiplexing is an integral multiple of a number of output ports of said first data string converter or a number of input ports of said second data string converter.

5. The array processor type data processing apparatus according to claim 1, wherein said first data string converter and said second data string converter can specify a conversion method by which to convert the placement of data, from outside, and convert data that are sequentially entered into input ports thereof according to the specified conversion method, and output the converted data from output ports thereof.

6. The array processor type data processing apparatus according to claim 1, wherein said data storage group comprise a first data storage group comprising a plurality of data storages which are connected to said first data string converter and which store data to be used in the operations executed by said array processing section, and a second data storage group comprising a plurality of data storages which are connected to said second data string converter and which store data of the results of the operations executed by said array processing section.

7. The array processor type data processing apparatus according to claim 1, wherein said data storage group comprise multiport data storages which are connected to both said first data string converter and said second data string converter and which store data to be used in the operations executed by said array processing section and data of the results of the operations executed by said array processing section.

8. A data string converting method in an array processor type data processing apparatus including a data storage group comprising a plurality of data storages that store data strings respectively therein, and an array processing section having a plurality of data processor elements arranged in an array of P×T, P and T being natural numbers equal to or larger than two, a plurality of input ports whose number is P, and a plurality of output ports whose number is P, wherein using data strings, whose number is T, entered from each of said plurality of input ports, said plurality of data processor elements execute predetermined operations while transferring data to each other, and output data strings of results of the operations from said plurality of output ports, wherein said data storage group stores data sequences, which are data strings for threads, as units of said threads altogether in said data storages, respectively;

a first data string converter has resources to convert the placement of the data strings, shared by a plurality of threads, converts data strings stored in said plurality of data storages of said data storage group into a P×T placement suitable for the operations in said array processing section, and enters the converted data strings into said plurality of input ports of said array processing section;

said array processing section, which is multithreaded so as to process the threads, each serving as an independent processing unit continuously by time-division multiplexing, processes the data strings into said input ports thereof by time-division multiplexing, and outputs results of operations on the threads from said plurality of output ports thereof in an order in which the threads are processed;

a second data string converter has resources to convert the placement of the data strings, shared by the threads, and converts the data strings output from said plurality of output ports of said array processing section into a T×P placement to be stored in said plurality of data storages of said data storage group;

said first data string converter converts the placement of data such that data entered in a plurality of cycles into one input port of the first data string converter are output in one cycle from a plurality of output ports of the first data string converter, and data entered in one cycle into a plurality of input ports of the first data string converter are output in a plurality of cycles from one output port of the first data string converter, thereby converting the placement of the data strings stored in the plurality of data storages of said data storage group into the P×T placement suitable for the operations in said array processing section; and said second data string converter converts the placement of data such that data entered in one cycle into a plurality of input ports of the second data string converter are output in a plurality of cycles from one output port of the second data string converter, and data entered in a plurality of cycles into one input port of the second data string converter are output in one cycle from a plurality of output ports of the second data string converter, thereby converting the placement of the data strings output from said plurality of output ports of said array processing section into the T×P placement to be stored in said plurality of data storages, wherein T is a number of said plurality of threads, and P is equal to T, wherein the P×T placement is a P×T array, the T×P placement is a T×P array, wherein in each of a plurality of P clock cycles, a successive column of the T×P array is input to said first data string converter, wherein in each of a plurality of T clock cycles beginning immediately after the plurality of P clock cycles, a successive row of the T×P array is output by said first data string converter as a corresponding successive column of the P×T array.

9. The data string converting method according to claim 8, wherein said first data string converter converts the data strings for the threads stored in said data storages of said data storage group from serial data into parallel data, and arranges the converted data strings as units of said threads in time sequence, thereby converting the placement of the data strings stored in the plurality of data storages of said data storage group into the placement suitable for the operations in said array processing section; and said second data string converter converts data strings of results of operations on the threads which have been output from said array processing section from parallel data into serial data, and arranges the converted data strings as units of said threads in parallel, thereby converting the placement of the data strings output from said output ports of said array processing section into the placement to be stored in said plurality of data storages.

10. The data string converting method according to claim 8, wherein the number of data strings which can be processed by said array processing section in time-division multiplexing is equal to a number of output ports of said first data string converter or a number of input ports of said second data string converter.

11. The data string converting method according to claim 8, wherein the number of data strings which can be processed by said array processing section in time-division multiplexing is an integral multiple of a number of output ports of said first data string converter or a number of input ports of said second data string converter.

12. The data string converting method according to claim 8, wherein said first data string converter and said second data string converter can specify a conversion method by which to convert the placement of data, from outside, and convert data that are sequentially entered into input ports thereof according to the specified conversion method, and output the converted data from output ports thereof.

13. The data string converting method according to claim 8, wherein said data storage group comprise a first data storage group comprising a plurality of data storages which are connected to said first data string converter and which store data to be used in the operations executed by said array processing section, and a second data storage group comprising a plurality of data storages which are connected to said second data string converter and which store data of the results of the operations executed by said array processing section.

14. The data string converting method according to claim 8, wherein said data storage group comprise multiport data storages which are connected to both said first data string converter and said second data string converter and which store data to be used in the operations executed by said array processing section and data of the results of the operations executed by said array processing section.

* * * * *